(12) United States Patent
Khayrallah et al.

(10) Patent No.: US 8,331,510 B2
(45) Date of Patent: Dec. 11, 2012

(54) RECEIVER AND METHOD FOR TWO-STAGE EQUALIZATION WITH SEQUENTIAL SEARCH

(75) Inventors: Ali Khayrallah, Cary, NC (US);
Gregory Bottomley, Cary, NC (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 919 days.

(21) Appl. No.: 12/419,053

(22) Filed: Apr. 6, 2009

(65) Prior Publication Data

US 2010/0254446 A1 Oct. 7, 2010

(51) Int. Cl.
| | |
|---|---|
| H03D 1/06 | (2006.01) |
| H03D 11/04 | (2006.01) |
| H03K 5/01 | (2006.01) |
| H03K 6/04 | (2006.01) |
| H04B 1/10 | (2006.01) |
| H04L 1/00 | (2006.01) |
| H04L 25/08 | (2006.01) |

(52) U.S. Cl. ......... 375/348; 375/229; 375/232; 375/346
(58) Field of Classification Search ................ 375/229, 375/232, 346, 348
See application file for complete search history.

(56) References Cited

U.S. PATENT DOCUMENTS

| | | | | |
|---|---|---|---|---|
| 5,483,557 | A * | 1/1996 | Webb | 375/349 |
| 5,513,215 | A * | 4/1996 | Marchetto et al. | 375/233 |
| 6,363,104 | B1 | 3/2002 | Bottomley | |
| 6,366,624 | B1 * | 4/2002 | Balachandran et al. | 375/341 |
| 6,529,559 | B2 * | 3/2003 | Reshef | 375/262 |
| 7,072,426 | B2 * | 7/2006 | Ha et al. | 375/331 |
| 7,274,745 | B2 * | 9/2007 | Chang et al. | 375/265 |
| 2006/0029124 | A1 * | 2/2006 | Grant et al. | 375/148 |
| 2008/0212722 | A1 * | 9/2008 | Heikkila | 375/341 |
| 2010/0254446 | A1 * | 10/2010 | Khayrallah et al. | 375/232 |

OTHER PUBLICATIONS

G. D. Forney, "Maximum-likelihood sequence estimation of digital sequences in the presence of intersymbol interference," IEEE Trans. Info. Theory, vol. IT-18, May 1972.

B. Hochwald and S. Ten Brink, "Achieving near-capacity on a multiple-antenna channel," IEEE Transactions on Communications, vol. 51, pp. 389-399, Mar. 2003.

J. B. Anderson and S. Mohan, "Sequential coding algorithms: a survey and cost analysis," IEEE Transactions on Communications. vol. COM-32. Feb. 1984.

G. Ungerboeck, "Adaptive maximum likelihood receiver for carrier modulated data transmission systems," IEEE Trans. Commun., vol. COM-22, May 1974.

H. Hadinejad-Mahram, "On the equivalence of linear MMSE chip-level equalizer and generalized RAKE," IEEE Commun. Letters, vol. 8, No. 1, Jan. 2004.

(Continued)

*Primary Examiner* — Shuwang Liu
*Assistant Examiner* — Sung Ahn

(57) ABSTRACT

A receiver and method are described herein that address inter-symbol interference in a received signal by using a two-stage equalizer which includes a first demodulation stage that processes the received signal and produces initial symbol decisions, and a non-linear equalization second stage that uses the received signal to perform a sequential search in an attempt to improve upon the initial symbol decisions where if able to improve upon the initial symbol decisions then an output sequence is obtained from the sequential search and if not able to improve upon the sequence metric threshold then the output sequence is the initial symbol decisions.

10 Claims, 3 Drawing Sheets

OTHER PUBLICATIONS

T. Gucluoglu and T. M. Duman, "Soft input soft output stack equalization for MIMO frequency selective fading channels," in Proc. IEEE Intl. Conf. Commun., Seoul, Korea, May 16-20, 2005, pp. 510-514.

Liu et al: Reliability-based near maximum-likelihood multiuser detection. MILCOM 2001 Proceedings, Communications for Network—Centric Operations: Creating The Information the Force, IEEE. LNKD-DOI: 10.1109/ MILCOM. 2001.985881, vol. 1, Oct. 28, 2001, pp. 576-580, XP01 05790751SBN: 978-0-7803-7225-2.

Choi et al. A low-complexity near-ML decoding technique via reduced dimension list stack algorithm. Sensor Array and Multichannel Signal Processing Workshop, Jul. 21, 2008, pp. 41-44, XP0313122821SBN: 978-1-4244-2240-1.

Hochwald et al. Silicon Complexity for Maximum Likelihood MIMO Detection Using Spherical Decoding. IEEE Journal of Solid-State Circuits, INKD-DOI: 10.1109/ JSSC. 2004 831454, vol. 39, No. 9, Jan. 9, 2004, pp. 1544-1552, XP0111179751SSN: 0018-9200.

* cited by examiner

RECEIVER AND METHOD FOR TWO-STAGE EQUALIZATION WITH SEQUENTIAL SEARCH

TECHNICAL FIELD

The present invention relates in general to the wireless telecommunications field and, in particular, to a receiver that mitigates inter-symbol interference in received symbols by using a two-stage equalizer with sequential search.

BACKGROUND

The following abbreviations are herewith defined, at least some of which are referred to within the following description of the state-of-the-art and the present invention. The reference to the "present invention" or "invention" used herein relates to exemplary embodiments and not necessarily to every embodiment that is encompassed by the appended claims.

| | |
|---|---|
| AWGN | Additive White Gaussian Noise |
| BCH | Broadcast Channel |
| BPSK | Binary Phase-Shift Keying |
| CDM | Code Division Multiplexing |
| CDMA | Code Division Multiple Access |
| DFE | Decision Feedback Equalization |
| FEC | Forward Error Correction |
| G-RAKE | Generalized-RAKE |
| HSDPA | High-Speed-Downlink-Packet Access |
| HSPA | High Speed Packet Access |
| ISI | Inter-Symbol Interference |
| LDPC | Low Density Parity Check Code |
| LE | Linear Equalization |
| LTE | Long Term Evolution |
| MIMO | Multiple Input Multiple Output |
| MISO | Multiple Input Single Output |
| MLSE | Maximum Likelihood Sequence Estimation |
| QAM | Quadrature Amplitude Modulation |
| RF | Radio Frequency |
| SIMO | Single Input Multiple Output |
| SISO | Single Input Single Output |
| TDM | Time Division Multiplexing |
| WCDMA | Wideband Code Division Multiple Access |

Cellular communication systems are evolving these days to have even higher data rates. For instance, HSPA communication systems provide higher data rates in both uplink and downlink by using higher-order signal constellations to send more bits in the same amount of time. The same is true for the LTE uplink. However, when the channel between a transmitter and receiver is dispersive, then intersymbol interference (ISI) results, which limits the availability of high data rates.

Receivers have used linear equalization to suppress ISI. For instance, WCDMA (HSPA, HSDPA) receivers have suppressed ISI by using linear equalization schemes such as G-Rake or chip equalization. In addition, receivers have used linear equalization for the LTE uplink, though it is performed in the frequency domain. Basically, the linear equalizer at high signal power levels tries to undo the channel to eliminate the ISI. The problem is that there is room for improvement.

There are two main non-linear equalization approaches used today which can improve upon linear equalization: (1) decision feedback equalization (DFE); and (2) maximum likelihood sequence estimation (MLSE). DFE is only slightly more complex than linear equalization, but the performance gains are modest. The receiver could use a block DFE which can provide larger gains, but this does not completely close the gap with linear equalization due to the linear suppression of future ISI and error propagation from past ISI. The MLSE can close the gap in performance, but it is highly complex. There are various ways to approximate MLSE performance with simplifications. For instance, the MLSE can be simplified with path pruning approaches such as the M-algorithm and T-algorithm which are still fairly complex. Plus, these processes have a problem with the large constellations and in particular the large fanout size which is equal to the constellation size q. In addition, these processes require a certain level of complexity to let the detected sequence emerge from the pruning process. This is all described in greater detail below with respect to an exemplary non-spread MIMO communication system discussed next with respect to FIGS. 1-4 (PRIOR ART).

Exemplary Communication System

Referring to FIG. 1 (PRIOR ART), there is a basic diagram of a traditional non-spread MIMO communication system 100 with a transmitter 102 (including an encoder 104, an interleaver 106, a modulator 108 and multiple transmit antennas 110) coupled by a channel 112 to a receiver 114 (including multiple receive antennas 116, a demodulator 118, a deinterleaver 120 and a decoder 122). In operation, the encoder 104 receives a block of information bits 124 and protects those bits by mapping them into a larger block of modem bits 126. The encoder 104 can perform this by using an error control code such as a binary code, for example a BCH code, a LDPC code, a convolutional code, or a turbo code. The interleaver 106 receives the modem bits 126, changes the order/indices of the modem bits 126, and outputs re-ordered bits 128.

The modulator 108 receives the re-ordered bits 128 and uses a modulation constellation to output symbols 130. In particular, the modulator 108 uses the modulation constellation of size q to map $\log_2 q$ consecutive bits into one of q modulation symbols when generating the output symbols 130. For instance, the modulator 108 can use a modulation constellation such as BPSK, with q=2, and 16-QAM, with q=16. The modulator 108 may also perform a filtering operation to produce partial response signaling. In addition, the modulator 108 may also perform a coded modulation operation, where the mapping of the current q bits depends on previous bits. For simplicity, the description provided herein will assume an un-coded modulation scheme. The modulation symbols are used to modulate an RF carrier.

The modulated symbols 130 are then transmitted by the transmit antennas 110 over the channel 112 to the receive antennas 116. The channel 112 represents the effects of fading in a wireless medium, the time dispersion, as well as the additive noise and interference on the transmitted symbols 130. Thus, the demodulator 118 receives a signal 132 which has been subjected to ISI. The ISI may also be due to the combined effects of partial response signaling and filtering at the transmitter 102, the multi-path dispersion over the wireless channel 112, and the filtering at the receiver 114. This channel model would also apply to other communication systems such as, for example, a CDMA system.

The receiver 114 performs the demodulation operation and the decoding operation separately. First, the demodulator 118 accepts the received signal 132, mitigates the ISI, and outputs estimates of the modem bits 134 in the form of soft bit values 134. The soft bit values 134 indicate the reliability of individual modem bits 126. The deinterleaver 120 receives the soft bit values 134 and changes their order/indices to be the reverse of that used by the interleaver 106. After de-interleaving, the re-ordered soft bit values 136 are fed to the decoder 122. The decoder 122 operates on the re-ordered soft bit values 136 to produce an estimate 138 of the information bits 124.

MIMO Demodulation Problem

The general MIMO demodulation problem is discussed next, with $L_1$ transmit antennas 110 and $L_2$ receive antennas 116. The transmitted and received signals 130 and 132 are represented by the vectors $s=(s_1,\Lambda,s_{L_1})^T$ and $r=(r_1,\Lambda,r_{L_2})^T$, respectively.

Each component of s is a symbol from a finite modulation constellation. The set Q contains all possible transmitted vectors. The size q of Q is the product of the constellation sizes of the $L_1$ components. That is, if $L_1$=2 and both signals use 16 QAM, then q=256. In this discussion, assume q to be a power of 2.

At the transmitter 102, there is a one-to-one mapping from blocks of $\log_2$ q modem bits 126 to modulation symbols 130.

i. Dispersive Channel Model

For a symbol-spaced channel 112 with memory M, there are M+1 channel matrices $H_M,\Lambda,H_0$, each of dimensions $L_2 \times L_1$. The element $H_{m,i,j}$ of $H_m$ describes the channel 112 from transmit antenna j to receive antenna i at a delay of m symbols. The current transmitted signal s is denoted $s_k$. The system model is given by:

$$r_k = H_M s_{k-M} + \Lambda + H_1 s_{k-1} + H_0 s_k + v_k \qquad (1)$$

where $v_k=(v_{k,1},\Lambda,v_{k,L_2})^T$ represents the noise. For simplicity, an additive white Gaussian noise (AWGN) model in time and in space is considered.

Equalizer Operation

The operation of the equalizer 118 (single stage equalizer 118) at the receiver 114 is discussed next. Assume that the transmitted signal 130 has a symbol vector sequence of length K. The receiver 114 processes the corresponding received values $(r_1,\Lambda,r_k)$ to try to identify the best sequence in a maximum likelihood sense. The appropriate metric is the squared error (or Euclidean distance).

Given a full sequence hypothesis, the corresponding sequence metric can be computed. The sequence metric can be written as a sum of K partial metrics, called branch metrics. The name will become clear in light of the tree structure described later. In this discussion, the notation $s_{a:b}=(s_a,\Lambda,s_b)$ is adopted and a full sequence is denoted as $s_{1K}$.

i. Branch Metric, Bias and Innovation

It is helpful to describe the branch metric in terms of bias and innovation. To account for the ISI properly in the model associated with equation no. 1 for k=1 to M, assume that the symbols $s_{-M+1:0}$ are known. For now, think of these symbols as the known reference symbols. At index k, the bias vector associated with past symbols is given by:

$$b_{k-1} = H_M s_{k-M} + \Lambda + H_1 s_{k-1} \qquad (2)$$

which is a function of the most recent M symbols $s_{k-M:k-1}$ only. By removing the bias vector from the received vector, the innovation vector is obtained and can be represented by:

$$c_k = r_k - b_{k-1}. \qquad (3)$$

This innovation represents the residual received value after removing the bias. Finally $c_k$ is compared to the corresponding symbol weighted by the channel matrix, to obtain the branch metric represented by:

$$\|c_k - H_0 s_k\|^2. \qquad (4)$$

ii. Sequence Metric

The sequence metric is given by:

$$\sum_{k=1}^{K} \|c_k - H_0 s_k\|^2. \qquad (5)$$

The sequence metric of equation no. 5 is the appropriate measure which is used to compare different total sequence hypotheses. The best total sequence is the one that minimizes the sequence metric.

iii. MLSE

The MLSE finds the best total sequence. The Viterbi process is one very efficient way to search for the best total sequence. It does so by using intermediate steps, where same length subsequences are compared. A brief discussion about the operation of the MLSE is provided herein to provide a contrast to that of a stack algorithm (discussed below), where unequal length sequences are compared.

The MLSE operates on a trellis with $q^M$ states, and $q^{M+1}$ branches per stage. The trellis has K+1 stages, indexed 0 to K, to handle the K received values. The MLSE starts at stage 0 and progresses towards stage K. At index k−1, each state represents a different combination of M symbols $(s_{k-M},\Lambda,s_{k-1})$, and is labeled with an innovation according to equation nos. 2 and 3.

A branch representing a symbol $s_k$ starts from $(s_{k-M},\Lambda,s_{k-1})$ and ends in state $(s_{k-M+1},\Lambda,s_k)$ at index k. The branch is labeled with a branch metric according to equation no. 4. This enables the computation of the sequence metric for sequence $(s_1,\Lambda,s_k)$ of length k, as an update of the sequence metric for $(s_1,\Lambda,s_{k-1})$.

At each state of stage k, the sequence metrics for all the sequences of length k ending in that state are compared. All of the sequences but the one with the lowest sequence metric are discarded, and the survivor is kept. Eventually, the last stage K is reached. Each state has a length K surviving sequence. The survivor with the lowest sequence metric is the best overall sequence.

The MLSE has some drawbacks since it compares only the same length sequences. Plus, the number of states $q^M$ and the number of branches $q^{M+1}$, which reflect the complexity of the MLSE process, grow very quickly with the modulation size Q or the memory M. Thus, as the number of states $q^M$ and the number of branches $q^{M+1}$ get large, MLSE becomes hopelessly complex.

iv. Intuitive Justification of the Fano Metric

Anticipating the workings of the stack algorithm, suppose one wants to compare two unequal length subsequences $s_{1:J}$ and $s'_{1:J'}$ with J<J'<K. Simply restricting the summation in equation no. 5 to J and J' does not work well. For instance, taking the metric difference, one would obtain:

$$\sum_{k=1}^{J} (\|c_k - H_0 s'_k\|^2 - \|c_k - H_0 s_k\|^2) + \sum_{k=J+1}^{J'} \|c_k - H_0 s'_k\|^2. \qquad (6)$$

The second summation in equation no. 6 is unbalanced and always nonnegative, so the shorter sequence will tend to win out too easily.

To balance out the comparison, the missing symbols need to be accounted for in each sequence. This can be done by adding a bias $\beta_k$ that does not depend on the missing symbols, and represents an estimate of the branch metric. The resulting total sequence metric is given by:

$$\sum_{k=1}^{J} \|c_k - H_0 s_k\|^2 + \sum_{k=J+1}^{K} \beta_k. \quad (7)$$

Furthermore, it is convenient to subtract the term $$\sum_{k=1}^{K} \beta_k$$

from equation no. 7. This has no effect on sequence metric comparisons. The resulting metric, denoted $E_J$, can be written as follows:

$$E_J = \sum_{k=1}^{J} (\|c_k - H_0 s_k\|^2 - \beta_k). \quad (8)$$

The corresponding branch metric, denoted $e_k$, is given by:

$$e_k = \|c_k - H_0 s_k\|^2 - \beta_k \quad (9)$$

This is known as the Fano metric. For clarity, the metric difference is revisited and by using equation no. 8 the following is obtained:

$$\sum_{k=1}^{J} (\|c_k - H_0 s'_k\|^2 - \|c_k - H_0 s_k\|^2) + \sum_{k=J+1}^{K} (\|c_k - H_0 s_k\|^2 - \beta_k). \quad (10)$$

The second sum in equation no. 10 is now balanced by the presence of $\beta_k$, unlike that in equation no. 6. This confirms the intuitive explanation that the Fano branch metric provides a balance to the comparison of unequal length sequences.

v. Bias Example

Referring back to equation no. 7, it can be recalled that the bias $\beta_k$ is an estimate of the branch metric at indices where that metric has not been computed. Ideally, one would like to have an accurate and simple estimate because accuracy leads to better performance, while simplicity is in keeping with the low complexity equalizer.

The simplest bias is the vector noise power. This corresponds to the assumption that the hypothesized symbols $s_{k-M:k}$ which affect the branch metric at index k are correct. Then it can be seen from equation nos. 1-3 that equation no. 4 reduces to the following:

$$\|c_k - H_0 s_k\|^2 = \|v_k\|^2. \quad (11)$$

The expected value of the right hand side is the vector noise power, denoted $P_k$. It can be estimated by averaging the error over recent symbols. Furthermore, for reasonably small values of the block length K, one can assume that the noise power is constant, so that the bias is a single value for all k. In general, the bias term can be proportional to the noise power. This approach and other approaches are described in T. Gucluoglu et al. "Soft Input Soft Output Stack Equalization for MIMO Frequency Selective Fading Channels," in Proc. IEEE Intl. Conf. Commun., Seoul, Korea, May 16-20, 2005, pp. 510-514 (the contents of which are incorporated by reference herein).

Stack Algorithm

The stack algorithm is an aggressive depth first tree search process with a simple structure. It is well suited for scenarios where the state space is very large, making breadth first techniques like the Viterbi process impractical.

A key feature of the stack algorithm is the comparison of symbol sequences of different lengths, for the purpose of ranking them as more or less likely eventual solutions. This is made possible by using the aforementioned Fano metric.

The stack algorithm described below is used as a representative example, there are other sequential search processes that can be used such as the single-stack algorithm and bucket process. These other sequential search processes are described in J. B. Anderson et al. "Sequential Coding Algorithms: A Survey and Cost Analysis," IEEE Transactions on Communications, vol. COM-32, February 1984 (the contents of which are incorporated by reference herein).

i. Search Tree

The stack algorithm operates on a tree of depth K. The root node of the tree, denoted $\Theta$, is at index 0. It is associated with the null sequence $\phi$ of length 0. A node N at index k−1 is associated with its subsequence $s_{1:k-1}$ starting from the root node. The fanout of node N is the set of branches B that start in N. Each branch is associated with a value for symbol $s_k$. For now, assume there are no restrictions on the fanout, and it has q branches, one for each symbol vector in Q. The extension of node N by a branch B results in a new node N' at index k, associated with the sequence $s_{1:k}$. The new nodes N' are referred to as the children, and N as the parent.

For reference purposes, one can think of the full tree of depth K, where each node is extended, and every possible sequence of length K is represented. FIG. 2 (Prior Art) illustrates an exemplary full tree 200 having a binary alphabet, q=2, and a depth K=3, and a root node $\Theta$ at index k=0. The exemplary full tree 200 also has branches B at index k which are labeled with the symbols $s_k$.

The stack algorithm does not need to search the full tree 200, but instead it could focus on the most likely sequences. In this sense, the stack algorithm defines a sparse sub-tree of the full tree 200. FIG. 3 (Prior Art) illustrates an exemplary sparse tree 300 that can be created by a stack search with a binary alphabet, q=2, and a depth K=3. In this diagram, the nodes are labeled N(i) according to their rank in the stack.

ii. Branch and Node Metrics

In this discussion, consider a node N at index k−1, with the associated subsequence $s_{1:k-1}$. The bias vector for N is explicitly denoted $b_{k-1}(N)$, and given by equation no. 2. The bias vector is a function of the most recent M symbols $s_{k-M:k-1}$ only and summarizes the effect of node N on the branch metrics at index k.

The innovation vector, explicitly denoted $c_k(N)$, is obtained by removing the bias vector from the received vector as given by equation no. 3. The innovation vector represents the residual received value after removing the bias of node N.

For each branch B in the fanout of N, $c_k$ is compared to the corresponding symbol weighted by the channel matrix, to get the branch metric, explicitly denoted $e_k(B)$, and given by the Fano metric of equation no. 9. The branch metric $e_k(B)$ is a function of the most recent M+1 symbols $s_{k-M:k}$ only.

The squared error first term in equation no. 9 corresponds to Forney's approach to equalization which is discussed in G. D. Forney "Maximum-likelihood sequence estimation of digital sequences in the presence of intersymbol interference," IEEE Trans. Info. Theory, vol. IT-18, May 1972 (the contents of which are incorporated by reference herein).

For a node N' resulting from the extension of node N by a branch B, the node metric of N' is given by:

$$E_k(N')=E_{k-1}(N)+e_k(B) \quad (12)$$

where $E_{k-1}(N)$ is the node metric of N. By default, the metric for node $\Theta$ is set to 0. Then using equation no. 12 one can build-up the node metric from node $\Theta$ to node N'.

An example of a node N extended via its fanout is shown in FIG. 4 (Prior Art). The exemplary node N is at index k−1=3 and is extended by the four branches in its fanout to produce four new children nodes N' at k=4. The bias $b_3(N)$ is used in computing the branch metric $e_4(B)$. The sequence metric $E_4(N')$ is computed from $E_3(N)$ and $e_4(B)$.

iii. Steps of Stack Algorithm

The stack algorithm includes an ordered list of nodes, with the best candidate on top (hence the term "stack"). The best node is removed from the stack and then extended via the branches in its fanout. The resulting new children nodes are slotted in the stack according to their sequence metric.

The stack algorithm is initialized with $\Theta$. The stack algorithm stops when the node at the top of the stack has index k=K. The sequence of length K corresponding to that node is the output. Exemplary pseudo-code of the stack algorithm is as follows:

```
stack initialized with root node
flag = 0
while flag == 0
    remove best node N from stack
    extend node N with branches from its fanout
    place new children nodes N' in stack
    if best node N has index = K
        flag = 1
    end
end
N corresponds to output symbol sequence
```

Referring again to the example in FIG. 3 (PRIOR ART), the nodes in the stack are labeled N(i) according to their rank. Since N(0) with index k=K is at the top of the stack, it is the winner. Its corresponding sequence (0,0,1) is the output of the stack algorithm.

Variants of the Stack Algorithm i. Stack Size Growth

Each iteration of the stack algorithm removes one node and adds q nodes. Thus, the stack size keeps growing. For large q or long blocks K, this may be impractical. As a result, it may be necessary to limit the stack size.

One approach is to set a size limit. Once the stack exceeds that limit, it is trimmed back by removing the candidates at the bottom. As long as the limit is large enough, the impact on performance is minimal, since the trimmed candidates are the least likely to succeed.

Another approach is to set a sequence metric threshold. If a candidate's sequence metric exceeds that threshold, it is trimmed from the stack. Again, as long as the threshold is large enough, the impact on performance is minimal, since the trimmed candidates are the least likely to succeed.

ii. Merging Sequences

As discussed above, the stack algorithm operates on a tree. In this exemplary ISI scenario however, the state space is finite, and can be described by a trellis, where paths merge together. While it may not be needed to resort to a trellis here, it may be beneficial to exploit the merging idea.

The finite space is reflected in the fact that the bias is a function of the most recent M symbols only. Thus, if two nodes N and N' at the same index k−1 agree in their most recent M symbols $s_{k-M:k-1}$, then their bias vectors are equal:

$$b_{k-1}(N)=b_{k-1}(N'). \quad (13)$$

Since nodes N and N' have the same bias vectors, their branch metrics will be the same at index k. Furthermore, everything from this point forward will be the same. This means that the two nodes can be merged. To do so, their sequence metrics $E_{k-1}(N)$ and $E_{k-1}(N')$ are compared and the node with the larger sequence metric is removed from the stack.

With an unbounded stack, merging nodes has no effect on performance, since the node with the larger sequence metric would never win. However, merging does affect complexity. Plus, one has to weigh the benefit of merging in reducing future operations, against the cost of keeping track of merging candidates, comparing them, and removing the worst ones.

With a bounded stack size, merging sequences may affect which nodes are trimmed. This is not likely to significantly impact performance.

With a stack limited by a metric threshold, the merging has no impact on performance.

iii. Getting Started (Initialization)

There are different ways to start the stack algorithm, depending on the transmission system. If pilot symbols are transmitted at the beginning, then the stack algorithm starts from a single, known state. In the absence of pilot symbols, there are several options. One is to start from multiple states corresponding to different combinations of the initial symbols. It may be necessary to initially perform a tree search/expansion before applying the stack pruning process. Merging sequences and stack pruning can be used to limit the increased number of sequences in the stack due to multiple initial states. Another option is to use information from the first stage to prune the multiple initial states to the most likely ones, including the extreme case of having a single starting state corresponding to detected symbol values from the first stage.

In view of the foregoing discussion about the various linear equalization approaches and the various non-linear equalization approaches, it can be seen that there is a need to address their various shortcomings to enable a receiver to effectively reduce the ISI in received symbols and output more reliable bits. This need and other needs are satisfied by the present invention.

SUMMARY

In one aspect, the present invention provides a receiver and an equalization method adapted to mitigate ISI in a received signal. The receiver has a two-stage equalizer which includes a demodulation first stage such as linear equalization that processes the received signal and produces initial symbol decisions and possibly additional information such as reliability measures and ranked lists of most likely symbols. The two-stage equalizer also includes a non-linear equalization second stage that uses the received signal and possibly the additional information to perform a sequential search in an attempt to improve upon the initial symbol decisions where if able to improve upon the initial symbol decisions then an output sequence is obtained from the sequential search and if not able to improve upon the initial symbol decisions then the output sequence is the initial symbol decisions. The two-stage equalizer combines the simplicity of linear equalization with the performance of the non-linear equalization which is desirable in cellular communication systems (e.g., HSPA systems, LTE systems) which have high data rates and high-order signal constellations.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings.

DETAILED DESCRIPTION

Figure 1:
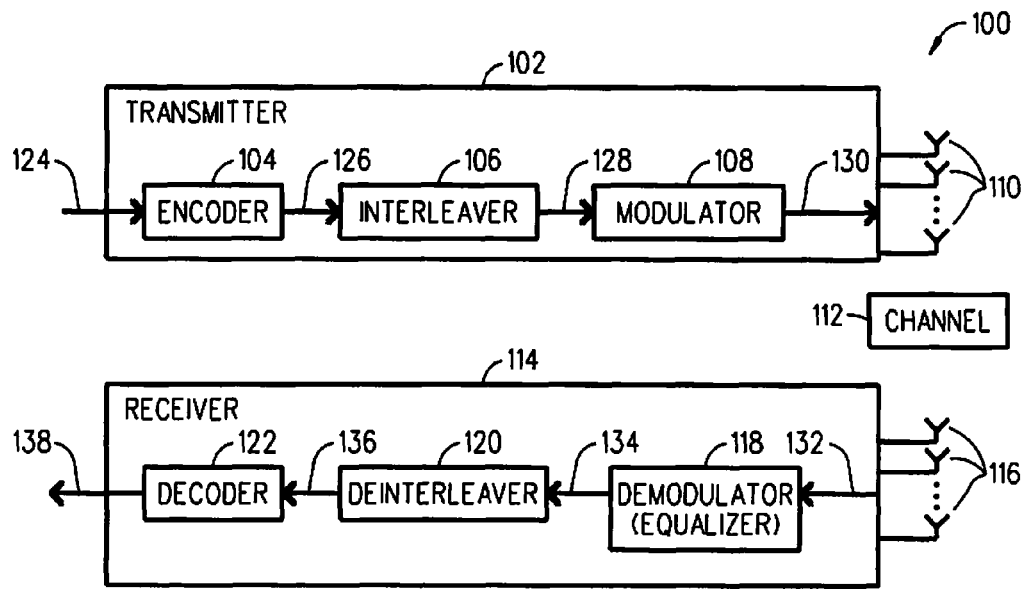
FIGS. 1-4 (PRIOR ART) are various diagrams including a traditional wireless communications system and a traditional receiver which is used to help explain various problems associated with reducing inter-symbol interference in received signals that are solved by the present invention.
Figure 2:
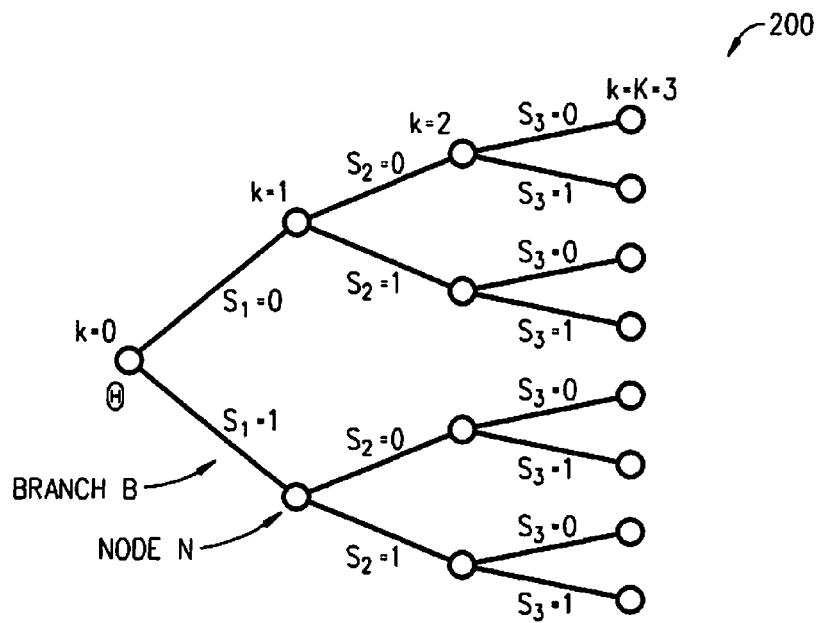
Figure 3:
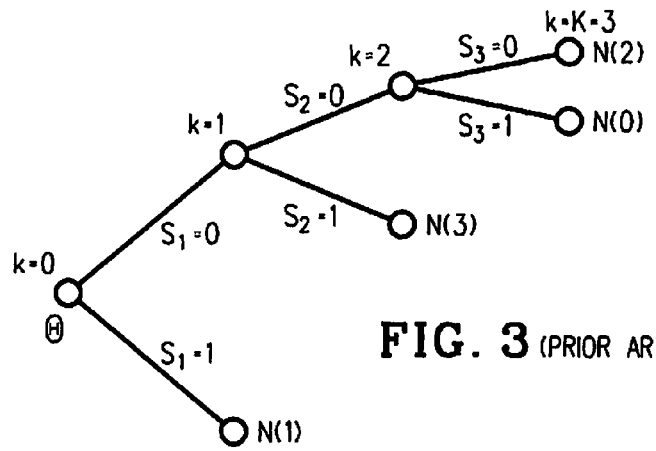
Figure 4:
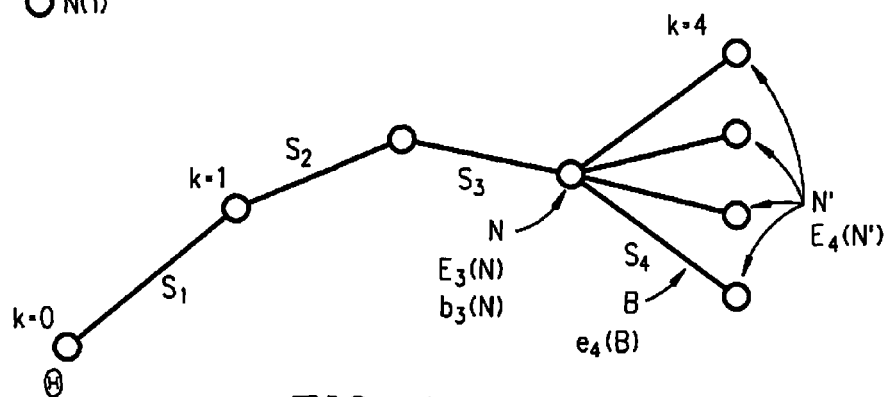
Figure 5:
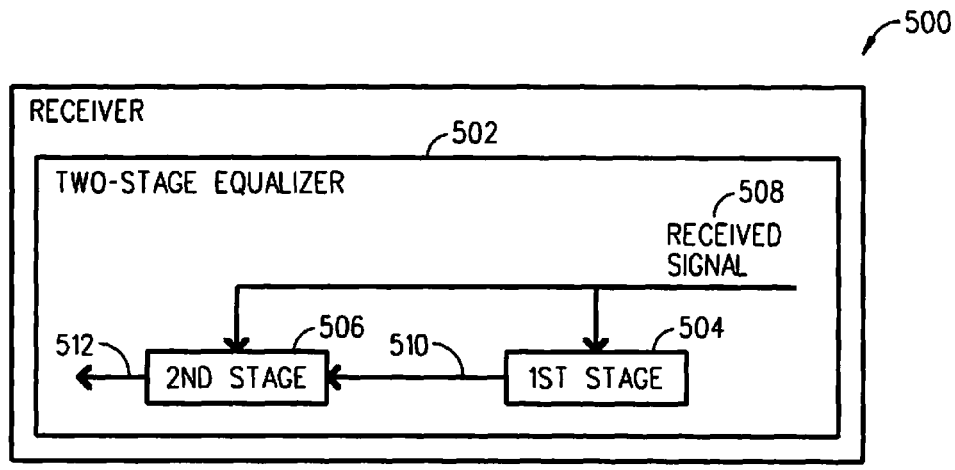
FIG. 5 is a basic diagram of a receiver with a two-stage equalizer that can be implemented in a wireless communication system (namely a base station or a user terminal) in accordance with the present invention.

Referring to FIG. 5, there is a basic diagram of a receiver 500 with a two-stage equalizer 502 that is configured in accordance with the present invention. The two-stage equalizer 502 includes a first stage 504 and a second stage 506 which reduce the ISI in a received signal 508. The first stage 504 can be a relatively simple form of demodulation such as a linear receiver which has, for instance, a matched filter, a zero-forcing filter, a chip equalizer, a RAKE, a GRAKE, or a variant thereof, that processes the received signal 508 and produces information 510 for use in the second stage 506. Alternatively, the first stage can also be nonlinear, such as a decision feedback equalizer. The second stage 506 can implement a modified sequential search or decoding method, such as a modified stack search structure, which processes the received signal 508 again, and incorporates the information 510 from the first stage 504 to accelerate and possibly restrict or refine its search to output more reliable bits 512. The information 510 from the first stage 506 may include, for example, symbol decisions, or symbol decisions augmented with reliability measures, or ranked lists of most likely symbols. Several exemplary embodiments of the receiver 500 are discussed in detail next but it should be appreciated that only the components relevant to the present invention are described herein while other well known components like the deinterleaver and the decoder have been omitted for clarity. It should also be appreciated that the receiver 500 is applicable to any number of transmit and receive antennas (SISO, SIMO, MISO, and MIMO).

BEAT-IT I

Figure 6:
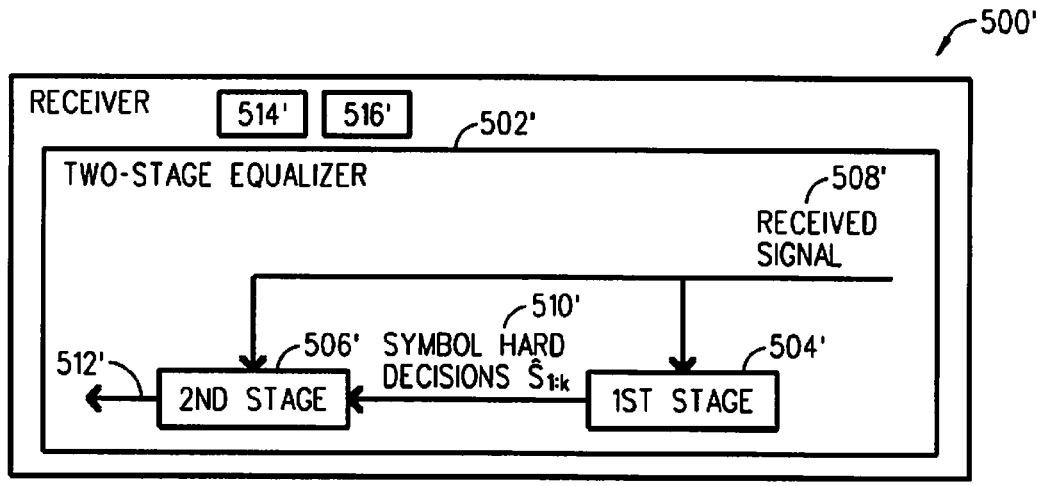
FIGS. 6-8 are basic diagrams of the receiver shown in FIG. 5 which are used to help explain several different embodiments of the two-stage equalizer in accordance with the present invention.

Referring to FIG. 6, there is a basic diagram of a receiver 500' with a two-stage equalizer 502' configured in accordance with a first embodiment of the present invention. The two-stage equalizer 502' includes a first stage 504' and a second stage 506' which reduce the ISI in a received signal 508'. The first stage 504' can be a relatively simple form of demodulation such as a linear receiver which has, for instance, a matched filter, a zero-forcing filter, a chip equalizer, a RAKE, a GRAKE, or a variant thereof, that processes the received signal 508' and produces symbol hard decisions ($\hat{s}_{1:K}$) 510' for use in the second stage 506'. Alternatively, the first stage 504' can also be nonlinear, such as a decision feedback equalizer. The second stage 506' implements a modified sequential search or decoding method, such as a modified stack search structure, which processes the received signal 508' again, and incorporates the symbol hard decisions ($\hat{s}_{1:K}$) 510' from the to first stage 504' to accelerate and possibly restrict or refine its search to output more reliable bits 512'.

In particular, the two-stage equalizer 502' has the first stage 504' which produces the symbol hard decisions ($\hat{s}_{1:K}$) 510' and feeds them to the second stage 506'. The second stage 506' takes the symbol hard decisions ($\hat{s}_{1:K}$) 510' along with the reference symbols $s_{-M+1:0}$ and computes the branch metrics and sequence metrics.

First, the total metric at index K that is denoted as $E_{max}$ is computed. The computation of $E_{max}$ is described next. At index 0, the bias is computed from the reference symbols $s_{-M+1:0}$ according to equation no. 2 and is as follows:

$$b_0 = H_M s_{-M+1} + \Lambda + H_1 s_0. \tag{14}$$

At index 1, the innovation is computed according to equation no. 3 and is as follows:

$$c_1 = r_1 - b_0 \tag{15}$$

where $r_1$ is the received signal 508'.

Then, the branch metric is computed according to equation no. 9, using the first symbol decision $\hat{s}_1$ as follows:

$$e_1 = \|c_1 - H_0 \hat{s}_1\|^2 - \beta_1. \tag{16}$$

The bias is computed using $s_{-M+2:0}$ and $\hat{s}_1$ as follows:

$$b_1 = H_M s_{-M+2} + \Lambda + H_2 s_0 + H_1 \hat{s}_1. \tag{17}$$

The following stages are handled in the same way. Eventually, index K is reached and the sequence metric is given by:

$$E_{max} = \sum_{k=1}^{K} e_k. \tag{18}$$

The symbol hard decisions ($\hat{s}_{1:K}$) 510' are now used as the initial solution to beat in the stack algorithm. To do this, the $E_{max}$ is set as a sequence metric threshold for the stack, as explained earlier. Then for a node N at index k to survive in the stack, its sequence metric has to satisfy:

$$E_k(N) < E_{max}. \tag{19}$$

At some point in the stack search, due to trimming, there may be one single node left in the stack. When it is removed and extended via its fanout, all the new children nodes may fail the condition in equation no. 19. Then the stack becomes empty. This means that the initial solution $\hat{s}_{1:K}$ could not be beat, and as such the initial solution $\hat{s}_{1:K}$ is the output of the second stage 506'.

To enable this embodiment, the receiver 500' may include a processor 514' and a memory 516' that stores processor-executable instructions where the processor 514' interfaces with the memory 516' and executes the processor-executable instructions to implement the following exemplary high level pseudo-code:

```
stack initialized with root node
flag1 = 0
flag2 = 1
while flag1 == 0 and flag2 == 1
    remove best node N from stack
    extend node N with branches from its fanout
    place new children nodes N' that pass threshold test in stack
    if new best node N has index = K
        flag1 = 1
    end
    if stack is empty
        flag2 = 0
    end
end
if flag1 == 1
    node N corresponds to output symbol sequence
else
    initial solution from first stage is output symbol sequence
end
```

Note: The processor 514' and the memory 516' are implemented, at least partially, as some combination of software, firmware, hardware, or hard-coded logic.

In this embodiment, the two-stage equalizer 502' includes a first stage 504' that processes the received signal 508' and produces initial symbol decisions $\hat{s}_{1:K}$ 510'. The two-stage equalizer 502' also includes a non-linear equalization second stage 506' that uses initial symbol decisions $\hat{s}_{1:K}$ and the received signal to compute a maximum total metric $E_{max}$ which is set as a sequence metric threshold and then considers other candidate symbol sequences to try and improve upon the sequence metric threshold and if able to improve upon the sequence metric threshold then the output sequence 512' is obtained from the sequential search and if not able to improve upon the sequence metric threshold then the output sequence 512' is the initial symbol decisions $\hat{s}_{1:K}$ 510'.

As described above, the two-stage equalizer 502' uses the symbol hard decisions ($\hat{s}_{1:K}$) 510' from the first stage 504' as an initial solution, which the second stage 506' then tries to beat. Thus, this embodiment is given the nickname BEAT-IT I. The other embodiments of the receiver 500 described in detail below also retain this basic approach and are referred to herein by the nicknames BEAT-IT II, BEAT-IT III, BEAT-IT IV and BEAT-IT V.

BEAT-IT II Through BEAT-IT V

Figure 7:
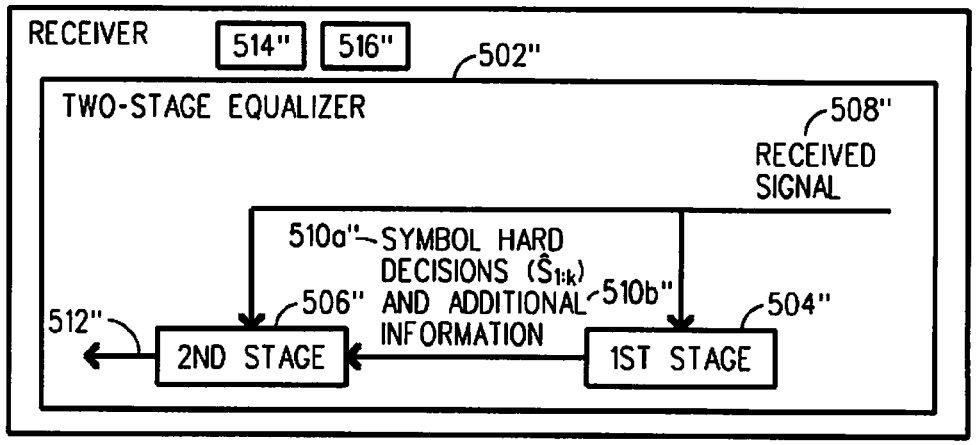

Referring to FIG. 7, there is a basic diagram of a receiver 500" with a two-stage equalizer 502" used to help explain several additional embodiments of the present invention. The two-stage equalizer 502" includes a first stage 504" and a second stage 506" which reduce the ISI in a received signal 508". The first stage 504" can be relatively simple form of demodulation such as a linear receiver which has, for instance, a matched filter, a zero-forcing filter, a chip equalizer, a RAKE, a GRAKE, or a variant thereof, that processes the received signal 508" and produces symbol hard decisions ($\hat{s}_{1:K}$) 510a" and additional information 510b" for use in the second stage 506". Alternatively, the first stage 504" can also be nonlinear, such as a decision feedback equalizer. The second stage 506" implements a modified sequential search or decoding method, such as a modified stack search structure, which processes the received signal 508" again, and incorporates the symbol hard decisions ($\hat{s}_{1:K}$) 510a" and the additional information 510b" from the first stage 504" to accelerate and possibly restrict or refine its search to output more reliable modem bits 512". The additional information 510b" indicates the reliability of each symbol $\hat{s}_k$ at index k, and it is used by the second stage 506" to restrict the fanout at index k.

BEAT-IT II

A more detailed two-stage equalizer 502" is described next when compared to the previously described two-stage equalizer 502', where the first stage 504" provides not just the symbol hard decisions ($\hat{s}_{1:K}$) 510a" but also the additional information 510b" to the second stage 506". The second stage 506" upon receiving the additional information 510b" sets the restricted constellation $Q'_k$ of size $q'_k$ for all k (recall the size of the unrestricted constellation Q is q). The value of $q'_k$ is between 1 and q. If the reliability of symbol $\hat{s}_k$ is very strong, then set:

$$Q'_k = \{\hat{s}_k\} \qquad (20)$$

and $q'_k = 1$. It will be seen later that the modified stack algorithm forces its decision $\check{s}_k$ to be equal to $\hat{s}_k$. At the other extreme, if the confidence in $\hat{s}_k$ is very low, then set:

$$Q'_k = Q \qquad (21)$$

and $q'_k = q$. As a result, the modified stack algorithm searches the full constellation at index k.

In between, the restricted constellation $Q'_k$ needs to be defined and several possible approaches for doing this will be described in the next section. At this point, assume that given the additional information 510b" from the first stage 504", the second stage 506" determines $Q'_k$ for all k.

i. Modified Stack with Fanout Restriction

The modified stack algorithm is initialized with Θ. It stops when the node at the top of the stack has index k=K. The sequence of length K corresponding to that node is the output. Consider the best node N with index k−1 at the top of the stack. It is removed from the stack, and extended via the branches in its fanout of size $q'_k$. The branches are labeled with the symbols in the restricted constellation set $Q'_k$. The branch metrics and sequence metrics are computed as before.

To enable this embodiment, the receiver 500" may include a processor 514" and a memory 516" that stores processor-executable instructions where the processor 514" interfaces with the memory 516" and executes the processor-executable instructions to implement the following exemplary high level pseudo-code:

```
stack initialized with root node
flag = 0
while flag == 0
    remove best node N (with index k − 1) from stack
    extend node N with branches from its restricted fanout at
index k
        place new children nodes N' in stack
        if new best node N has index = K
            flag = 1
        end
end
node N corresponds to output symbol sequence
```

Note: The processor 514" and the memory 516" are implemented, at least partially, as some combination of software, firmware, hardware, or hard-coded logic.

In this embodiment, the two-stage equalizer 502" includes a first stage 504" that processes the received signal 508" and outputs the initial symbol decisions $\hat{s}_{1:K}$ 510a" which are augmented with reliability measures $\mu_k$ 510b", where the reliability measures $\mu_k$ 510b" indicate a reliability of each symbol $\hat{s}_k$ at index k. The two-stage equalizer 502' also includes the non-linear equalization second stage 506" that uses the initial symbol decisions $\hat{s}_{1:K}$ and the reliability measures $\mu_k$ to restrict a fanout of at least one index k of the sequential search by setting a restricted constellation $Q'_k$ of size $q'_k$, where the value of $q'_k$ is between 1 and q, wherein if the reliability measure of symbol $\hat{s}_k$ is low then set $Q'_k=Q$ and $q'_k=q$, and if the reliability measure of symbol $\hat{s}_k$ is in between then the fanout is restricted when performing the sequential search to try and improve upon the initial symbol decisions $\hat{s}_{1:K}$ 510$a''$ and if able to improve upon the initial symbol decisions $\hat{s}_{1:K}$ 510$a''$ then the output sequence is a best node N from the sequential search and if not able to improve upon the initial symbol decisions $\hat{s}_{1:K}$ 510$a''$ then the output sequence 512" is the initial symbol decisions $\hat{s}_{1:K}$ 510$a''$.

BEAT-IT III

An even more detailed two-stage equalizer 502" is described next in which the features of BEAT-IT I and BEAT-IT II are combined by incorporating the threshold $E_{max}$ of BEAT-IT I to trim the stack of BEAT-IT II.

That is, $E_{max}$ serves as a threshold as in BEAT-IT I, so that only nodes N with $E_k(N) < E_{max}$ survive in the stack. Also, as in BEAT-IT II, the constellation at stage k is restricted to a subset $Q'_k$ of Q. Then, as explained earlier, if the stack becomes empty, then the initial solution $\hat{s}_{1:K}$ could not be beat, and it is the output 512" of the second stage 506".

To enable this embodiment, the receiver 500" may include a processor 514" and a memory 516" that stores processor-executable instructions where the processor 514" interfaces with the memory 516" and executes the processor-executable instructions to implement the following exemplary high level pseudo-code:

```
stack initialized with root node
flag1 = 0
flag2 = 1
while flag1 == 0 and flag2 == 1
    remove best node N (with index k − 1) from stack
    extend node N with branches from its restricted fanout at
index k
        place new children nodes N' that pass threshold test in stack
        if new best node N has index = K
            flag1 = 1
        end
        if stack is empty
            flag2 = 0
        end
end
if flag1 == 1
    node N corresponds to output symbol sequence
else
    initial solution from first stage is output symbol sequence
end
```

Note: The processor 514" and the memory 516" are implemented, at least partially, as some combination of software, firmware, hardware, or hard-coded logic.

In this embodiment, the two-stage equalizer 502" includes a first stage 504" that processes the received signal 508" and outputs the initial symbol decisions $\hat{s}_{1:K}$ 510$a''$ which are augmented with reliability measures $\mu_k$ 510$b''$, where the reliability measures $\mu_k$ 510$b''$ indicate a reliability of each symbol $\hat{s}_k$ at index k. The two-stage equalizer 502" also includes a non-linear equalization second stage 506" that uses the initial symbol decisions $\hat{s}_{1:K}$ 510$a''$ and the reliability measures $\mu_k$ 510$b''$ to restrict a fanout of at least one index k of a sequential search by setting a restricted constellation $Q'_k$ of size $q'_k$ for all k. The second stage 506" also uses initial symbol decisions $s_{-M+1:0}$ and the received signal 508" to compute a maximum total metric $E_{max}$ which is set as a sequence metric threshold and tries and improve upon the sequence metric threshold which was limited based on the restricted constellation $Q'_k$ and if able to improve upon the sequence metric threshold then the output sequence 512" is a best node N from the sequential search and if not able to improve upon the sequence metric threshold then the output sequence 512" is the initial symbol decisions $\hat{s}_{1:K}$ 510$a''$.

Fanout Restriction

Several methods for fanout restriction are described next. First, a scenario is considered where the information from the first stage 504" consists of hard symbol decisions, or soft symbol decisions, which can be thought of as hard symbol decisions 510$a''$ augmented with reliability measures 510$b''$. Several exemplary methods are described below which exploit either type of information to restrict the fanout. They leave the stack algorithm unchanged otherwise.

Another type of information that can be outputted from the first stage 504" is an ordered list of most likely symbols for each index k. An exemplary method is described below which uses this list in a straightforward way with only very small change to the stack algorithm itself.

In addition, an exemplary method is described below which further exploits the order information in the ordered list, and modifies the stack algorithm itself to make it more aggressive in a depth first sense. This exemplary method introduces a secondary stack, where the nodes which are removed from the primary stack are kept instead of being discarded.

i. Fanout Restriction and Reliability

If reliability information 510$b''$ for $\hat{s}_k$ 510$a''$ is absent, then a single restricted fanout can be used according to the approaches described below.

If reliability information 510$b''$ for $\hat{s}_k$ 510$a''$ is available, assume that it is summarized as a single number $\mu_k$ for the purposes of this discussion. The connection between the size of the fanout and symbol reliability 510$b''$ is discussed next.

In the simplest case, $\mu_k$ can be quantized as high or low, according to a threshold. If $\mu_k$ is high, then make $Q'_k$ smaller. In particular, set $Q'_k = \{\hat{s}_k\}$. If $\mu_k$ is low, then make $Q'_k$ larger. In the extreme case, set $Q'_k = Q$, but typically make $Q'_k$ smaller in the approaches below.

In general, $\mu_k$ can be quantized to multiple levels, according to thresholds. Then, the corresponding versions of $Q'_k$ can be set to increasingly expanding subsets of Q.

ii. Bit Flipping

Recall that each value of symbol $\hat{s}_k$ corresponds to $\log_2 q$ modem bits values, denoted $\hat{x}_k = (\hat{x}_{k,1}, \Lambda, \hat{x}_{k,\log_2 q})$. Consider a specific bit $\hat{x}_{k,i}$, and let $\bar{x}_k(i)$ denote $\hat{x}_k$ with bit $\hat{x}_{k,i}$ flipped. Also let $\bar{s}_k(i)$ denote the symbol corresponding to $\bar{x}_k(i)$.

In general, the symbols $\bar{s}_k(i)$ are not necessarily close to $\hat{s}_k$ in Euclidean distance, even in the SIMO case, $L_1=1$. Furthermore, in the MIMO case, $L_1>1$, even if $\bar{s}_k(i)$ and $\hat{s}_k$ are close, their corresponding values after taking the channel into account may not be close.

However, in the case of Gray mapping from bits to symbols, $\bar{s}_k(i)$ is close to $\hat{s}_k$ for most i. This makes bit-flipping an attractive approach. Plus, bit flipping is a very convenient way for producing modem bit soft values, as discussed later.

a. Single Bit Flipping

If $\mu_k$ is available, it can be exploited by switching between $Q'_k = \{\hat{s}_k\}$ and $$Q'_k = \{\hat{s}_k, \bar{s}_k(1), \Lambda, \bar{s}_k(\log_2 q)\}. \tag{22}$$

If reliability information $\mu_k$ 510$b''$ is absent, then set the fanout to equation no. 22. For the sake of brevity, from here on assume that the reliability information $\mu_k$ 510$b''$ is available.

b. Double Bit Flipping

Bit flipping can be taken further by allowing double bit flipping, where $\bar{s}_k(i,j)$ has bits i and j flipped. Then $\mu_k$ can be quantized to three levels. The smallest set is set to $\{\hat{s}_k\}$, the second set adds the single flipped symbols $\bar{s}_k(i)$, and the third set adds the double flipped symbols $\bar{s}_k(i,j)$. This scheme can be generalized to any number of bits being flipped.

iii. Constellation Neighbors

Another approach is to consider constellation neighbors. In the SIMO case, $L_1=1$, one can identify the neighbors in a Euclidean distance sense. In the MIMO case, $L_1>1$, one can identify the neighbors in the sub-constellation for each stream separately.

As in the bit flipping case, $Q'_k$ can be sized according to the reliability information $\mu_k$ 510b". For a high value, switch to $Q'_k=\{\hat{s}_k\}$. For a low value, augment $Q'_k$ to include the nearest neighbors.

Taking the idea further, one can also identify the second nearest neighbors, and so on, and augment $Q'_k$ accordingly.

iv. Modified Sphere Decoding

Sphere decoding is an effective low complexity search technique which has been used in the demodulation of very large constellations or MIMO signals. In its original form, sphere decoding works for non-dispersive channels, in a symbol by symbol manner as discussed in B. Hochwald et al., "Achieving near-capacity on a multiple-antenna channel," IEEE Transactions on Communications, vol. 51, pp. 389-399, March 2003 (the contents of which are incorporated by reference herein). Sphere decoding has also been adapted to Viterbi type equalizers for dispersive channels. This was discussed in detail in co-assigned U.S. patent application Ser. No. 12/286,339, filed Sep. 30, 2008 and entitled "Frequency Generation Techniques" (the contents of which are incorporated by reference herein).

The basic idea of sphere decoding is to search for a solution in a small subset of the most likely candidates. The subset is a sphere centered at a preliminary estimate of the transmitted signal, and whose radius $\rho$ is a design parameter. A smaller radius reduces computations but increases the risk of missing the correct solution.

In the present invention, the general approach described in the aforementioned U.S. patent application Ser. No. 12/286, 339 is adapted for using the sphere decoding in the stack search. The details of the specialized search for symbols within the sphere, as well as other details would be the same as described in the aforementioned U.S. patent application Ser. No. 12/286,339 and will not be discussed further here.

For the sake of simplicity, assume that $L_2 \geq L_1$. The center of the sphere is found from the innovation $c_k$ given in equation no. 3 as follows:

$$\tilde{s}_k = (H_0^H H_0)^{-1} H_0^H c_k. \tag{23}$$

In this formulation, the sphere center is influenced by the older symbol estimates from the first stage 504", via $c_k$, but not the current symbol estimate $\hat{s}_k$. The triangular matrix U below is obtained by Cholesky decomposition of $H_0^H H_0$. A modified metric to identify whether a symbol value $s_k$ is within the sphere can be defined as follows:

$$f(s_k) = (s_k - \tilde{s}_k)^H U^H U (s_k - \tilde{s}_k). \tag{24}$$

The restricted fanout is now the sphere restricted by $\rho$ as follows:

$$Q'_k = \{s_k \in Q_k : f(s_k) \leq \rho^2\}. \tag{25}$$

Sphere Radius and Reliability Information

In keeping with the scheme of relating the fanout size to reliability, the radius $\rho$ can be related to the reliability information 510b". That is, if reliability is high, then the radius is smaller, and if reliability is low, then the radius is larger. In particular, the radius can be quantized to match the quantized reliability.

Since, $\tilde{s}_k$ is a continuous variable which does not account for the discrete constellation it is possible that for a small radius, $\hat{s}_k$ could fall outside $Q'_k$ in equation no. 25. To ensure that $\hat{s}_k$ does belong to $Q'_k$, equation no. 25 could be modified as follows:

$$Q'_k = \{\hat{s}_k\} \cup \{s_k \in Q_k : f(s_k) \leq \rho^2\}. \tag{26}$$

v. Ordered List

Here assume that for each index k, the first stage 504" produces an ordered list of most likely $q_k$ candidate symbol vectors. Such information 510b" is the byproduct of generalized decision functions, which identify the best candidate $\hat{s}_k^{(1)}$ (equal to the hard symbol $\hat{s}_k$), the second best $\hat{s}_k^{(2)}$, etc, down to $\hat{s}_k^{(q_k)}$. An ordered list 510b" may be viewed as a form of soft information about $\hat{s}_k$.

In a first method, the restricted fanout can be made equal to the ordered list as follows:

$$Q'_k = \{\hat{s}_k^{(1)}, \hat{s}_k^{(2)}, \theta \hat{s}_k^{(q_k)}\}. \tag{27}$$

Then run the stack algorithm as before. Recall that a node N at index k−1 is removed from the stack, and its children nodes are formed by extending N with the branches corresponding to the symbols in $Q'_k$. The resulting nodes are then placed in the stack according to their node metric.

There is an advantage in processing the placement of the new children nodes in the stack according to the order information. This assumes that the order information 510b", which came from the first stage 504", is a good prediction of the relative order of the new nodes in the stack.

In this process, let $N'^{(i)}$ denote the new node corresponding to $\hat{s}_k^{(i)}$. First, place $N'^{(1)}$ in the stack and start the comparison to the nodes in the stack from the top. The $N'^{(i)}$ location in the stack is denoted as $\lambda^{(1)}$. Secondly, place $N'^{(2)}$ in the stack and start the comparison to the nodes in the stack from $\lambda^{(1)}$ to find its location $\lambda^{(2)}$. Next, place $N'^{(3)}$ in the stack and start the comparison from $\lambda^{(2)}$, and so on. The idea in the above approach is to reduce the number of comparisons in an average sense.

vi. Order List and Modified Stack Algorithm (BEAT-IT IV and BEAT-IT V)

If desired, the structure of the stack algorithm can be modified to more fully exploit the order information 510b". The resulting process is more aggressive in a depth first sense, in that it is more likely to go deeper faster in the tree.

Again consider node $N'^{(1)}$ of the best symbol in the list. Suppose that the comparison to the stack results in $\lambda^{(1)}=1$, meaning that it is the best in the stack, and the best candidate at this intermediate point. When this happens, the second stage 506" does not continue with the placement of $N'^{(2)}$ to $N'^{(q_k)}$. Instead, the second stage 506" extends $N'^{(1)}$ to index k+1 according to the restricted fanout $Q'_{k+1}$.

The remaining new nodes $N'^{(2)}$ to $N'^{(q_k)}$, which did not get a chance to be placed in the stack need to be accounted. The remaining new nodes $N'^{(2)}$ to $N'^{(q_k)}$ can be accounted by keeping them alive in a secondary stack as will be explained in greater detail below.

More generally, assume the new children nodes are processed according to the order information 510b", and $N'^{(i)}$ is the first node for which $\lambda^{(i)}=1$. In this case, the second stage 506" does not need to continue with the placement of the remaining nodes $N'^{(i+1)}$ to $N'^{(q_k)}$. Instead, $N'^{(i)}$ is extended to index k+1 according to the restricted fanout $Q'_{k-1}$.

a. Secondary Stack

In this example, reconsider node N where its first i extensions have been placed in the primary stack, and $N'^{(i)}$ is the best in the primary stack. To keep track of $N'^{(i+1)}$ to $N'^{(q_k)}$ for possible future use, place them in a secondary stack, according to their node metric.

b. Visiting the Secondary Stack

The remaining issue is when to visit the secondary stack. In the discussion below, two variants of the stack search are considered where one variant has a threshold test and the other variant does not have a threshold test.

First, consider the variant where the stack algorithm does not have a threshold test. Eventually, the primary stack reaches the point where the best node N has index K. At this point, the primary stack would be done and the best node N would be placed in the secondary stack. If it is the best node in the secondary stack, then the process is done and N produces the output sequence 512". If N is not the best node in the secondary stack, then another node from the secondary stack is given a chance. Since the remaining nodes in the primary stack have lost to N, they are removed for good. The best node in the secondary stack is moved to the primary stack. The search can now continue. This variant of the two-stage equalizer 502" is denoted herein as BEAT-IT IV.

To enable this embodiment, the receiver 500" may include a processor 514" and a memory 516" that stores processor-executable instructions where the processor 514" interfaces with the memory 516" and executes the processor-executable instructions to implement the following exemplary high level pseudo-code:

```
Primary and secondary stacks initialized with root node
Flag1 = 0
while flag1 == 0
    remove best node N (with index k – 1) from primary stack
    flag2 = 0
    i = 0
    while flag2 == 0 or i < q_k'
        i = i + 1
        place N'^(i) in primary stack
        if λ^(i) == 1
            flag2 = 1
            place N'^(i+1) ... N'^(q'k) in secondary stack
        end
    end
    if new best node N has index k = K
        flag1 = 1
    end
end
place node N in secondary stack
if N is best node in secondary stack
    N_corresponds to output symbol sequence
else
    empty primary stack
    move best node in secondary stack to primary stack
    resume stack search
end
```

Note: The processor 514" and the memory 516" are implemented, at least partially, as some combination of software, firmware, hardware, or hard-coded logic.

In this embodiment, the two-stage equalizer 502" includes a first stage 504" that processes the received signal 508" and outputs the initial symbol decisions $\hat{s}_{1:K}$ 510a" which are augmented with an ordered list 510b" of most likely candidate symbol vectors $q_k$. The two-stage equalizer 502" also includes a non-linear equalization second stage 506" that uses the ordered list 510b" to restrict a fanout of a sequential search by setting a restricted constellation $Q'_k$ of size $q'_k$ for all k. The second stage 506" also performs a sequential search using a primary stack and a secondary stack and when the primary stack reaches a point where a best node N identified in the ordered list is full length then that node N is placed in the secondary stack and if that node N is also the best node in the secondary stack then that node N produces the output sequence and if the best node N in the primary stack is not the best node in the secondary stack then another node from the secondary stack is moved to the primary stack and the sequential search continues to try and improve upon the initial symbol decisions $\hat{s}_{1:K}$ 510a" and if able to improve upon the initial symbol decisions initial symbol decisions $\hat{s}_{1:K}$ 510a" then the output sequence 512" is a best node N from the continued sequential search and if not able to improve upon the initial symbol decisions after the continued sequential search then the output sequence 512" is the initial symbol decisions initial symbol decisions $\hat{s}_{1:K}$ 510a".

The variant with a threshold test is considered next. Here it is possible for the primary stack to become empty, because all the candidate nodes fail the threshold test. If this happens, then the secondary stack is visited. If secondary stack is empty as well, then the initial sequence 510a" from the first stage 504" is the output sequence 512". Otherwise, the node N at the top of the secondary stack is moved to the primary stack. If the node N has index k=K, then the process is done. Otherwise, the node N is extended as before. If the primary stack eventually becomes empty again, then the secondary stack is revisited, and so on. This variant of the two-stage equalizer 502" is denoted herein as BEAT-IT V.

To enable this embodiment, the receiver 500" may include a processor 514" and a memory 516" that stores processor-executable instructions where the processor 514" interfaces with the memory 516" and executes the processor-executable instructions to implement the following exemplary high level pseudo-code:

```
Primary and secondary stacks initialized with root node
flag1 = 0
flag2 = 1
while flag1 == 0 and flag2 == 1
    remove best node N (with index k – 1) from primary stack
    flag3 = 0
    i = 0
    while flag3 == 0 or i < q_k'
        i = i + 1
        place N'^(i) in primary stack
        if λ^(i) == 1
            flag3 = 1
            place N'^(i+1) ... N'^(q'k) in secondary stack
        end
    end
    if new best node N has index k = K
        flag1 = 1
    end
    if primary stack is empty
        if secondary stack is empty
            flag2 = 0
        else
            move best node in secondary stack to primary stack
            resume stack search
        end
    end
end
if flag2 == 0
    initial solution from first stage is output symbol sequence
else
    place node N in secondary stack
    if node N is best node in secondary stack
        N_corresponds to output symbol sequence
    else
        empty primary stack
        move best node in secondary stack to primary stack
        resume stack search
    end
end
```

Note: The processor 514" and the memory 516" are implemented, at least partially, as some combination of software, firmware, hardware, or hard-coded logic.

In this embodiment, the two-stage equalizer 502" includes a first stage 504" that processes the received signal 508" and outputs the initial symbol decisions $\hat{s}_{1:K}$ 510a" which are augmented with an ordered list 510b" of most likely candidate symbol vectors $q_k$. The two-stage equalizer 502" also includes a non-linear equalization second stage 506" that uses the ordered list 510b" to restrict a fanout of a sequential search by setting a restricted constellation $Q'_k$ of size $q'_k$ for all k. The second stage 506" also performs a sequential search using a threshold, a primary stack and a secondary stack and when the primary stack becomes empty because all candidate nodes fail the threshold then the secondary stack is visited and if the secondary stack is empty then the initial symbol decisions $\hat{s}_{1:K}$ 510a" are the output sequence 512", otherwise a node N at a top of the secondary stack is moved to the primary stack and if this node N has full length then this node N is the output sequence 512" and if this node N does not have full length then the primary stack is extended and the process continues until the primary stack becomes empty and the secondary stack is revisited until a node has full length and this node is the output sequence 512".

Bias Term Revisited

In the background section, noise power was used for the bias term. In this solution, other bias terms may work better.

i. Constellation Distance

The noise power bias term may be considered to be optimistic, since it assumes that all symbols are correct. Another estimate that could be used accounts for symbol errors. In describing this estimate, assume that the symbol error rate, denoted $\epsilon$, is known.

For simplicity, assume that the old hypothesized symbols $s_{k-M:k-1}$ are correct, and that the current hypothesized symbol vector $s_k$ is in error with a probability $\epsilon$. Moreover, assume that the error occurs in a single symbol $s_{k,j}$ among the $L_1$ components of $s_k$, and that the error is to a nearest neighbor in the component constellation of $s_{k,j}$. Let $d_{min,j}$ denote the Euclidean distance to the nearest neighbor in the component constellation.

Let $H_{0,j}$ denote column j of channel matrix $H_0$, describing the channel of symbol $s_{k,j}$ from antenna j. The most likely error to a first order approximation occurs for the value $j_0$ of j that minimizes the effective minimum distance accounting for the channel, and is given by:

$$\|H_{0,j}\|d_{min,j}. \tag{28}$$

Using the above approximations, equation no. 4 can be written as follows:

$$\|c_k - H_0 s_k\|^2 \approx \|H_{0,j_0}\|^2 d_{min,j_0}^2 + P_k \tag{29}$$

for the case of a symbol error, which occurs with probability $\epsilon$. For the case of no symbol error, the estimate remains $P_k$. Averaging the two cases, the bias becomes:

$$\beta_k = \epsilon \|H_{0,j_0}\|^2 d_{min,j_0}^2 + P_k. \tag{30}$$

ii. Smaller Bias Based on Constellation Minimum Distance

To obtain a smaller estimate of the bias, it can be contended that when a nearest neighbor error occurs, its most likely cause is a noise value that causes the received value to just cross the halfway point between the correct and incorrect symbols. The magnitude of that noise value is $\|H_{0,j}\|d_{min,j}/2$. Hence, the estimate of equation no. 4 can be written as follows:

$$\|c_k - H_0 s_k\|^2 \approx \frac{\|H_{0,j_0}\|^2 d_{min,j_0}^2}{4} \tag{31}$$

for the case of a symbol error. This yields a bias value as follows:

$$\beta_k = \epsilon \frac{\|H_{0,j_0}\|^2 d_{min,j_0}^2}{4} + (1-\epsilon)P_k. \tag{32}$$

It is possible to obtain more accurate estimates of the bias with more complex computations. However, these more complex computations would be expected to quickly reach diminishing returns in terms of the impact on the performance of the two-stage equalizer 502".

iii. Bias as Control Parameter

The aforementioned sequential search approaches take a variable amount of time for completion. As such, it is possible that this search can run out of time, as a new block of received data needs to be processed. To address this problem, suppose one considers the number of nodes visited as a simple estimate of completion time.

It is also possible to use $\beta_k$ as a parameter to control how aggressively the search proceeds depth first. In general, the larger values of $\beta_k$ favor longer sequences, and thus encourage aggressive depth first progression, whereas smaller values favor shorter sequences, and thus encourage more exhaustive breadth first progression. Of course, a more aggressive depth first process tends to visit fewer nodes and finish quicker, at the risk of skipping the best symbol sequence. Two approaches are proposed herein to use the bias as a control parameter.

The first approach is to introduce a fixed offset from an initial bias estimate. That is, compute one of the above estimates, say equation no. 32, then add a fixed positive or negative percentage offset. The offset is fixed throughout the block being processed.

The second approach uses a variable offset within the block. That is, suppose that the search is wandering around and visiting many nodes, having wasted half of its allocated completion time, with none of the candidates in the stack having exceeded depth K/2. Then, a positive offset can be added to the bias, to encourage the search to reach a solution. Conversely, if the search immediately locks on a sequence, and reaches depth K/2, with very few nodes visited, then a negative offset can be added to the bias, to encourage the search to consider other candidates.

HSPA Multi-Code Example

Figure 8:
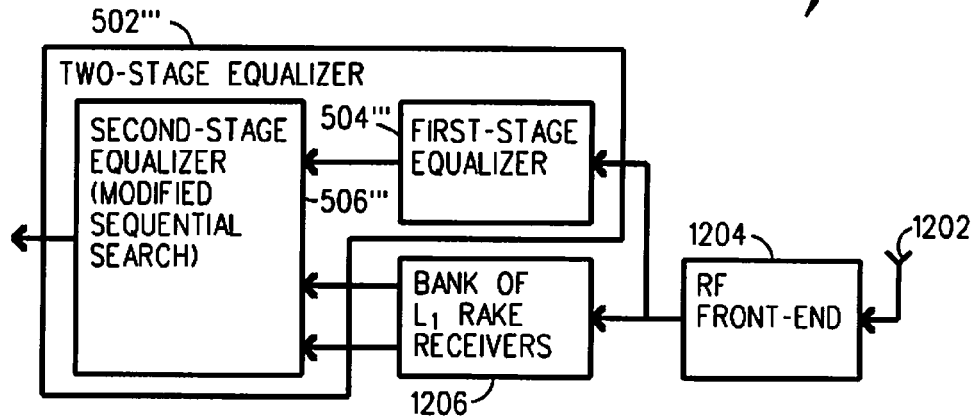

Referring to FIG. 8, there is a basic diagram of a HSPA multi-code receiver 500''' with a two-stage equalizer 502''' (including the first stage equalizer 504''' and the second stage equalizer 506''') configured in accordance with an embodiment of the present invention. In this example, the receiver 500''' has a receive antenna 1202 coupled to a RF front end 1202 which is coupled to a bank of $L_1$ Rake receivers 1204 and the first stage equalizer 504'''. The bank of $L_1$ Rake receivers 1204 and the first stage equalizer 504''' are both coupled to the second stage equalizer 506''' (modified sequential search). It should be appreciated that only the components associated with the receiver 500''' that are relevant to the present invention are described herein while other well known components like the deinterleaver and the decoder have been omitted for clarity.

In this example, HSPA, the evolution of Wideband CDMA is considered. At high data rates, symbols are sent both in series (time division multiplexing or TDM) and in parallel (code division multiplexing or CDM). The $L_1$ symbols sent in parallel can be collected into a symbol vector, similar to the aforementioned MIMO example.

The CDM is achieved by spreading each symbol using an Nc-chip sequence. At the receiver 500''', Nc chip samples from symbol period k can be collected into a vector and modeled using equation no. 1, where the elements of each H can be determined by the channel response and the spreading code values.

The metric in equation no. 5 can be used and would be considered a "chip-level" metric in that chip samples are used to form the metric.

i. Ungerboeck Approach (Symbol-Level Metric)

A more efficient approach would be to use Rake-combined values instead of chip samples. The Rake-combined or initial symbol estimates can be combined into a vector z(k). This leads to the Ungerboeck metric:

$$-Re\left\{s_k^H\left[2z(k) - S(0,k)s_k - 2\sum_{l>0} S(l,k)s_{k-l}\right]\right\} \quad (33)$$

where $s_k$ is a hypothesized symbol vector, as before, and $S(\lambda,k)$ is the Ungerboeck "s-parameter" matrix that gives the response of the true symbol vector at index (k-$\lambda$) on z(k). The Ungerboeck metric may also include an impairment correlation matrix when the noise is not white. Expressions for the s-parameters for CDMA can be found in co-assigned U.S. patent application Ser. No. 10/412,504, filed Apr. 11, 2003 and entitled "Joint Multi-Code Detectors in CDMA Communication System" (the contents of which are incorporated by reference herein).

The Ungerboeck metric is particularly useful with the channel response is fractionally-spaced, as this gives a fractionally-spaced Rake front-end. If there is interference from other signals, then the Rake front-end can be replaced by a G-Rake+-front end as described in co-assigned U.S. patent application Ser. No. 12/177,498, filed Jul. 22, 2008 and entitled "Method and Apparatus for Communication Signal Processing Based on Mixed Parametric and Non-Parametric Estimation of Impairment Correlations" (the contents of which are incorporated by reference herein).

ii. Bias for Ungerboeck Metric

The bias term of the Ungerboeck metric is slightly different. The Ungerboeck metric is obtained by expanding the Euclidean distance metric and dropping the term corresponding to the power in the received vector. This term can be added back in so that the Ungerboeck bias term becomes:

$$\tilde{\beta}_k = \beta_k - \|r_k\|^2 \quad (34)$$

Subtracting equation no. 34 from equation no. 33 yields the corresponding Fano branch metric:

$$\tilde{e}_k = -Re\left\{s_k^H\left[2z(k) - S(0,k)s_k - 2\sum_{l>0} S(l,k)s_{k-l}\right]\right\} - \beta_k + \|r_k\|^2. \quad (35)$$

LTE Uplink Example

In the uplink of the LTE system being developed, a form of single-carrier modulation is used in which symbols are sent sequentially at a high rate. The baseline receiver is a frequency-domain linear equalizer. This equalizer can be used to obtain an initial solution. Then, the proposed approaches described herein can be used to obtain a refined solution.

Extensions i. Partial Modified Stack

It may be useful to limit the modified stack search to a part of the total sequence. That is, instead of considering the whole block 1:K, consider a smaller block $K_1:K_2$. The reason may be that the computational resources available are limited, forcing a choice to focus the second stage on a smaller block.

Given the choice $K_1:K_2$, the modified stack can operate in the same way as before. The received values needed are $(r_{K_1}, \Lambda, r_{K_2})$, and the reference symbols needed are $s_{K_1-M:K_1-1}$.

Next, the specific changes to three versions of the modified stack algorithm are provided.

a. BEAT-IT I

The second stage 506' takes the hard symbol decisions $\hat{s}_{K_1:K_2}$, along with the symbols $\hat{s}_{K_1-M:K_1-1}$ used as reference symbols. This means that there is a need to choose $K_1$ such that $\hat{s}_{K_1-M:K_1-1}$ are reliable when they come from the first stage 504'' (see FIG. 6).

Next, compute the branch metrics and sequence metrics according to equations nos. 9 and 12, starting at index $K_1$. Also, $E_{max}$ is now the total metric at index $K_2$.

Use $E_{max}$ as a sequence metric threshold for the stack. If the stack becomes empty, then the initial solution $\hat{s}_{K_1:K_2}$ is the output 512' of the second stage 506'.

b. Other BEAT-IT Processes

The remaining BEAT-IT II-V processes can be modified in the same way, by limiting their operation to indices k between $K_1$ and $K_2$, as well as using the modified $E_{max}$ where a threshold is relevant.

c. Tail symbols

A specific case of the partial modified stack is described next. Assume that the last M symbols are very reliable, so that the second stage 506'' sets $Q'_k=\{\hat{s}_k\}$ and $q'_k=1$ for those indices. This is equivalent to having tail symbols, which would force sequences to go to the same state on a trellis. On the tree, the modified stack algorithm would be applied as is. The last M branches serve to capture the full effect of the symbols up to index $K_2-M-1$ in the branch metrics and in the sequence metrics.

Soft Value Generation

Typically soft bit values are needed for subsequent FEC decoding, such as turbo decoding or convolutional decoding. These can be obtained using any of the standard approaches used with sequential decoders or a pruned MLSE.

One approach is to perform bit flipping for each bit. A second path metric is determined by flipping a particular bit. The difference between this path metric and the winning path's path metric gives the soft information for that bit.

Finite Decision Depth

In examples above, it was assumed that the process started at the root node and proceeded until the last node. Often, a decision depth was used. After all candidates on the stack have exceeded a certain length D, the oldest symbol vector in each path is decided, typically from the best sequence on the stack.

At this point, an ambiguity check may be performed. Those sequences that do not agree with this symbol value are discarded from the stack.

Running out of Time

Recall that the number of nodes visited can be an estimate of completion time. If the number of nodes visited reaches a preset maximum without yielding a solution, then the search is stopped. Two approaches are described next for the demodulator output.

In the first approach, assume that the second stage 506 has failed, and revert back to the first stage 504. That is, the initial sequence solution 510 from the first stage is the final output 512.

In the second approach, interpret the failure of the second stage 506 as an indication that the initial sequence solution 510 from the first stage 504 is unreliable, thus requiring a large number of node visits in the second stage 506. Consequently, the final output of the demodulator is to declare an erasure. In the decoder, the corresponding modem bits have to be treated as punctured bits, that is bits for which there is no hard or soft information available. Typically, the decoder input is the aggregate of several demodulator blocks. So an erasure may still leave enough unpunctured modem bits for the decoder to succeed.

From the foregoing, several exemplary receivers have been described to provide a thorough understanding of the present invention. The receivers include a two-stage equalizer and method for equalization that combines the simplicity of linear equalization (first stage) with the performance of nonlinear equalization (second stage). The second stage uses one of several techniques to restrict its search over a subset of the constellation. This includes an adaptation of sphere decoding. The two-stage equalizer is well suited for scenarios where the effective modulation constellation size is very large, making a Viterbi equalizer impractical. The two-stage equalizer is also well suited for large channel dispersion (relative to symbol duration) as its complexity does not grow exponentially with channel dispersion. The two-stage equalizer can be used in many different scenarios such as, for example, the aforementioned WCDMA multi-code scenario (both uplink and downlink), which effectively creates a very large total constellation. Another scenario of interest is the LTE uplink, which employs a form of single carrier transmission. MIMO reception in WCDMA, LTE, and WiMAX is yet another scenario of interest. For simplicity, the description above assumed un-coded modulation. However, if the transmission system includes coded modulation, then the two-stage equalizer can be adjusted to handle that as well as a form of ISI.

Although multiple embodiments of the present invention has been illustrated in the accompanying Drawings and described in the foregoing Detailed Description, it should be understood that the invention is not limited to the disclosed embodiments, but instead is also capable of numerous rearrangements, modifications and substitutions without departing from the spirit of the invention as has been set forth and defined by the following claims.

What is claimed is:

1. A receiver adapted to mitigating inter-symbol interference in a received signal, said receiver comprising:
a two-stage equalizer including:
a demodulation first stage that processes the received signal and produces initial symbol decisions; and
a non-linear equalization second stage that uses the received signal to perform a sequential search in an attempt to improve upon the initial symbol decisions, wherein:
if able to improve upon the initial symbol decisions, then an output sequence is obtained from the sequential search; and
if not able to improve upon the initial symbol decisions, then the output sequence is the initial symbol decisions, wherein:
the first stage outputs the initial symbol decisions $\hat{s}_{1:K}$ which are augmented with reliability measures $\mu_k$, where the reliability measures $\mu_k$ indicate a reliability of each symbol $\hat{s}_k$ at index k; and
the second stage uses the initial symbol decisions $\hat{s}_{1:K}$ and the reliability measures $\mu_k$ to restrict a fanout of at least one index k of the sequential search by setting a restricted constellation $Q'_k$ of size $q'_k$, where the value of $q'_k$ is between 1 and q.

2. The receiver of claim 1, wherein the fanout is restricted by at least one of quantizing the reliability measures $\mu_k$ into multiple thresholds, bit flipping, considering constellation neighbors, and sphere decoding.

3. A receiver adapted to mitigating inter-symbol interference in a received signal, said receiver comprising:
a two-stage equalizer including:
a demodulation first stage that processes the received signal and produces initial symbol decisions; and
a non-linear equalization second stage that uses the received signal to perform a sequential search in an attempt to improve upon the initial symbol decisions, wherein:
if able to improve upon the initial symbol decisions, then an output sequence is obtained from the sequential search; and
if not able to improve upon the initial symbol decisions, then the output sequence is the initial symbol decisions, wherein:
the first stage outputs the initial symbol decisions $\hat{s}_{1:K}$ which are augmented with reliability measures $\mu_k$, where the reliability measures $\mu_k$ indicate a reliability of each symbol $\hat{s}_k$ at index k;
the second stage uses the initial symbol decisions $\hat{s}_{1:K}$ and the reliability measures $\mu_k$ to restrict a fanout of at least one index k of the sequential search by setting a restricted constellation $Q'_k$ of size $q'_k$; and
the second stage uses the initial symbol decisions $\hat{s}_{1:K}$ and the received signal to compute a maximum total metric $E_{max}$ which is set as a sequence metric threshold and tries to improve upon the sequence metric threshold which was limited based on the restricted constellation $Q'_k$.

4. A receiver adapted to mitigating inter-symbol interference in a received signal, said receiver comprising:
a two-stage equalizer including:
a demodulation first stage that processes the received signal and produces initial symbol decisions; and
a non-linear equalization second stage that uses the received signal to perform a sequential search in an attempt to improve upon the initial symbol decisions, wherein:
if able to improve upon the initial symbol decisions, then an output sequence is obtained from the sequential search; and
if not able to improve upon the initial symbol decisions, then the output sequence is the initial symbol decisions, wherein:
the first stage outputs the initial symbol decisions $\hat{s}_{1:K}$ which are augmented with an ordered list of most likely candidate symbol vectors $q_k$;
the second stage uses the ordered list to restrict a fanout of the sequential search by setting a restricted constellation $Q'_k$ of size $q'_k$ for all k; and
the second stage performs a sequential search using a primary stack and a secondary stack and when the primary stack reaches a point where a best node N identified in the ordered list is full length then that node N is placed in the secondary stack and if that node N is also the best node in the secondary stack then that node N produces the output sequence and if the best node N in the primary stack is not the best node in the secondary stack then another node from the secondary stack is moved to the primary stack and the sequential search continues to try and improve upon the initial symbol decisions.

5. A receiver adapted to mitigating inter-symbol interference in a received signal, said receiver comprising:
  a two-stage equalizer including:
    a demodulation first stage that processes the received signal and produces initial symbol decisions; and
    a non-linear equalization second stage that uses the received signal to perform a sequential search in an attempt to improve upon the initial symbol decisions, wherein:
  if able to improve upon the initial symbol decisions, then an output sequence is obtained from the sequential search; and
  if not able to improve upon the initial symbol decisions, then the output sequence is the initial symbol decisions, wherein:
  the first stage outputs the initial symbol decisions $\hat{s}_{1:K}$ which are augmented with an ordered list of most likely candidate symbol vectors $q_k$;
  the second stage uses the ordered list to restrict a fanout of the sequential search by setting a restricted constellation $Q'_k$ of size $q'_k$ for all k; and
  the second stage performs a sequential search using a threshold, a primary stack and a secondary stack and when the primary stack becomes empty because all candidate nodes fail the threshold then the secondary stack is visited and if the secondary stack is empty then the initial symbol decisions are the output sequence, otherwise a node N at a top of the secondary stack is moved to the primary stack and if this node N has full length then this node N is the output sequence and if this node N does not have full length then the primary stack is extended and the process continues until the primary stack becomes empty and the secondary stack is revisited until a node has full length and this node is the output sequence.

6. A method for mitigating inter-symbol interference in a received signal, said method comprising the steps of:
  using a demodulation first stage that processes the received signal and produces initial symbol decisions; and
  using a non-linear equalization second stage that uses the received signal to perform a sequential search in an attempt to improve upon the initial symbol decisions where if able to improve upon the initial symbol decisions then an output sequence is obtained from the sequential search and if not able to improve upon the initial symbol decisions then the output sequence is the initial symbol decisions, wherein:
  the first stage outputs the initial symbol decisions $\hat{s}_{1:K}$ which are augmented with reliability measures $\mu_k$, where the reliability measures $\mu_k$ indicate a reliability of each symbol $\hat{s}_k$ at index k; and
  the second stage uses the initial symbol decisions $\hat{s}_{1:K}$ and the reliability measures $\mu_k$ to restrict a fanout of at least one index k of the sequential search by setting a restricted constellation $Q'_k$ of size $q'_k$, where the value of $q'_k$ is between 1 and q.

7. The method of claim 6, wherein the fanout is restricted by at least one of quantizing the reliability measures $\mu_k$ into multiple thresholds, bit flipping, considering constellation neighbors, and sphere decoding.

8. A method for mitigating inter-symbol interference in a received signal, said method comprising the steps of:
  using a demodulation first stage that processes the received signal and produces initial symbol decisions; and
  using a non-linear equalization second stage that uses the received signal to perform a sequential search in an attempt to improve upon the initial symbol decisions where if able to improve upon the initial symbol decisions then an output sequence is obtained from the sequential search and if not able to improve upon the initial symbol decisions then the output sequence is the initial symbol decisions, wherein:
  the first stage outputs the initial symbol decisions $\hat{s}_{1:K}$ which are augmented with reliability measures $\mu_k$, where the reliability measures $\mu_k$ indicate a reliability of each symbol $\hat{s}_k$ at index k;
  the second stage uses the initial symbol decisions $\hat{s}_{1:K}$ and the reliability measures $\mu_k$ to restrict a fanout of at least one index k of the sequential search by setting a restricted constellation $Q'_k$ of size $q'_k$; and
  the second stage uses the initial symbol decisions $\hat{s}_{1:K}$ and the received signal to compute a maximum total metric $E_{max}$ which is set as a sequence metric threshold and tries to improve upon the sequence metric threshold which was limited based on the restricted constellation $Q'_k$.

9. A method for mitigating inter-symbol interference in a received signal, said method comprising the steps of:
  using a demodulation first stage that processes the received signal and produces initial symbol decisions; and
  using a non-linear equalization second stage that uses the received signal to perform a sequential search in an attempt to improve upon the initial symbol decisions where if able to improve upon the initial symbol decisions then an output sequence is obtained from the sequential search and if not able to improve upon the initial symbol decisions then the output sequence is the initial symbol decisions, wherein:
  the first stage outputs the initial symbol decisions $\hat{s}_{1:K}$ which are augmented with an ordered list of most likely candidate symbol vectors $q_k$;
  the second stage uses the ordered list to restrict a fanout of the sequential search by setting a restricted constellation $Q'_k$ of size $q'_k$ for all k; and
  the second stage performs a sequential search using a primary stack and a secondary stack and when the primary stack reaches a point where a best node N identified in the ordered list is full length then that node N is placed in the secondary stack and if that node N is also the best node in the secondary stack then that node N produces the output sequence and if the best node N in the primary stack is not the best node in the secondary stack then another node from the secondary stack is moved to the primary stack and the sequential search continues to try and improve upon the initial symbol decisions.

10. A method for mitigating inter-symbol interference in a received signal, said method comprising the steps of:
  using a demodulation first stage that processes the received signal and produces initial symbol decisions; and
  using a non-linear equalization second stage that uses the received signal to perform a sequential search in an attempt to improve upon the initial symbol decisions where if able to improve upon the initial symbol decisions then an output sequence is obtained from the sequential search and if not able to improve upon the initial symbol decisions then the output sequence is the initial symbol decisions, wherein:
  the first stage outputs the initial symbol decisions $\hat{s}_{1:K}$ which are augmented with an ordered list of most likely candidate symbol vectors $q_k$;

the second stage uses the ordered list to restrict a fanout of the sequential search by setting a restricted constellation $Q'_k$ of size $q'_k$ for all k; and the second stage performs a sequential search using a threshold, a primary stack and a secondary stack and when the primary stack becomes empty because all candidate nodes fail the threshold then the secondary stack is visited and if the secondary stack is empty then the initial symbol decisions are the output sequence, otherwise a node N at a top of the secondary stack is moved to the primary stack and if this node N has full length then this node N is the output sequence and if this node N does not have full length then the primary stack is extended and the process continues until the primary stack becomes empty and the secondary stack is revisited until a node has full length and this node is the output sequence.

* * * * *

UNITED STATES PATENT AND TRADEMARK OFFICE
CERTIFICATE OF CORRECTION

PATENT NO. : 8,331,510 B2
APPLICATION NO. : 12/419053
DATED : December 11, 2012
INVENTOR(S) : Khayrallah et al.

It is certified that error appears in the above-identified patent and that said Letters Patent is hereby corrected as shown below:

On Page 2, in Field (56), under "OTHER PUBLICATIONS", in Column 1, Line 5, delete "et al:" and insert -- et al., --, therefor.

On Page 2, in Field (56), under "OTHER PUBLICATIONS", in Column 1, Line 6, delete "detection. MILCOM 2001" and insert -- detection, MILCOM 2001, --, therefor.

On Page 2, in Field (56), under "OTHER PUBLICATIONS", in Column 1, Line 8, delete "IEEE." and insert -- IEEE, --, therefor.

On Page 2, in Field (56), under "OTHER PUBLICATIONS", in Column 2, Line 2, delete "algorithm." and insert -- algorithm, --, therefor.

On Page 2, in Field (56), under "OTHER PUBLICATIONS", in Column 2, Line 6, delete "Decoding." and insert -- Decoding, --, therefor.

On Page 2, in Field (56), under "OTHER PUBLICATIONS", in Column 2, Line 7, delete "INKD" and insert -- LNKD --, therefor.

On Page 2, in Field (56), under "OTHER PUBLICATIONS", in Column 2, Line 7, delete "JSSC." and insert -- JSSC, --, therefor.

In Column 3, Line 25, in Equation (1), delete "$\Lambda+H_1s_k-1$" and insert -- $\Lambda+H_1s_{k-1}$, --, therefor.

In Column 3, Line 45, delete "$s_{1K}$." and insert -- $s_{1:K}$. --, therefor.

In Column 3, Line 51, delete "$s_{-M+10}$" and insert -- $s_{-M+1:0}$ --, therefor.

In Column 4, Line 53, delete "$s'_{1:J}$" and insert -- $s'_{1:J'}$ --, therefor.

Signed and Sealed this
Second Day of April, 2013

Teresa Stanek Rea
*Acting Director of the United States Patent and Trademark Office*

CERTIFICATE OF CORRECTION (continued)
U.S. Pat. No. 8,331,510 B2

In Column 5, Line 28, in Equation (9), delete "-$\beta_k$" and insert -- -$\beta_k$. --, therefor.

In Column 10, Line 12, after "from", delete "the to" and insert -- the --, therefor.

In Column 10, Line 19, delete "$s_{-M+10}$" and insert -- $s_{-M+1:0}$ --, therefor.

In Column 10, Line 24, delete "$s_{-M+10}$" and insert -- $s_{-M+1:0}$ --, therefor.

In Column 12, Line 15, delete "$\tilde{s}_k$" and insert -- $\overline{s}_k$ --, therefor.

In Column 13, Line 63, delete "$s_{-M+10}$" and insert -- $s_{-M+1:0}$ --, therefor.

In Column 14, Line 49, delete "$\hat{s}_k(i)$" and insert -- $\overline{s}_k(i)$ --, therefor.

In Column 14, Line 60, in Equation (22), delete "$\{\hat{s}_k, \overline{s}_k\}$" and insert -- $\{\hat{s}_k, \overline{s}_k\}$ --, therefor.

In Column 16, Line 20, in Equation (27), delete "$\theta$" and insert -- $\Lambda$ --, therefor.

In Column 20, Line 3, in Equation (31), delete "$\dfrac{\|H_{0,j_0}\|^2 d_{min,j_0}^2}{4}$" and insert -- $\dfrac{\|H_{0,j_0}\|^2 d_{min,j_0}^2}{4}$ --, therefor.

In Column 20, Line 10, in Equation (32), delete "$\dfrac{\|H_{0,j_0}\|^2 d_{min,j_0}^2}{4}$" and insert -- $\dfrac{\|H_{0,j_0}\|^2 d_{min,j_0}^2}{4}$ --, therefor.

In Column 22, Line 21, delete "504'"" and insert -- 504' --, therefor.

In Column 25, Line 61, in Claim 7, delete "quantinizing" and insert -- quantizing --, therefor.